(12) United States Patent
O'Brien et al.

(10) Patent No.: US 7,779,252 B2
(45) Date of Patent: Aug. 17, 2010

(54) COMPUTER ARCHITECTURE FOR A HANDHELD ELECTRONIC DEVICE WITH A SHARED HUMAN-MACHINE INTERFACE

(75) Inventors: Terence W. O'Brien, Webster, NY (US); Richard Schmalbach, Timonium, MD (US); John Blessing, Eldersburg, MD (US); Bruce Borsa, Geneva, NY (US)

(73) Assignee: Harris Corporation, Melbourne, FL (US)

( * ) Notice: Subject to any disclaimer, the term of this patent is extended or adjusted under 35 U.S.C. 154(b) by 1050 days.

(21) Appl. No.: 11/385,063

(22) Filed: Mar. 21, 2006

(65) Prior Publication Data

US 2007/0223689 A1 Sep. 27, 2007

(51) Int. Cl.
*G06F 21/00* (2006.01)
(52) U.S. Cl. .......................................... 713/164; 726/16
(58) Field of Classification Search .................... 380/30
See application file for complete search history.

(56) References Cited

U.S. PATENT DOCUMENTS

| | | | | |
|---|---|---|---|---|
| 5,956,404 | A * | 9/1999 | Schneier et al. | 713/180 |
| 6,775,778 | B1 * | 8/2004 | Laczko et al. | 713/194 |
| 2002/0138548 | A1 * | 9/2002 | Neebe et al. | 709/201 |
| 2003/0204801 | A1 * | 10/2003 | Tkacik et al. | 714/726 |
| 2004/0039924 | A1 * | 2/2004 | Baldwin et al. | 713/189 |
| 2005/0114687 | A1 * | 5/2005 | Zimmer et al. | 713/193 |
| 2005/0132186 | A1 * | 6/2005 | Khan et al. | 713/165 |
| 2005/0273602 | A1 * | 12/2005 | Wilson et al. | 713/164 |
| 2006/0059345 | A1 * | 3/2006 | Fayad et al. | 713/173 |
| 2006/0078109 | A1 * | 4/2006 | Akashika et al. | 380/30 |
| 2006/0195907 | A1 * | 8/2006 | Delfs et al. | 726/26 |

* cited by examiner

*Primary Examiner*—Gilberto Barron, Jr.
*Assistant Examiner*—David Le
(74) *Attorney, Agent, or Firm*—Fox Rothschild, LLP; Robert J. Sacco

(57) ABSTRACT

Mobile PDA computer system (300) includes a secure user processor (302), a non-secure user processor (306), a cryptographic engine (304), and a shared human/machine interface (HMI) (308). The secure user processor (302) can be comprised of a first trusted microprocessor and a first trusted operating system executing on the first trusted microprocessor. The non-secure user processor (306) can be comprised of a second non-trusted microprocessor and a second non-trusted operating system executing on the second non-trusted microprocessor. A cryptographic engine (304) can be comprised of a third trusted cryptographic processor and a third trusted operating system executing on the third trusted cryptographic processor. The cryptographic engine can be configured for encrypting and decrypting data. A first data communication link (303) communicates data between the secure user processor and the cryptographic engine. A second data communication link (305) communicates data between the cryptographic engine and the non-secure user processor. In this way, the cryptographic engine forms a bridge between the secure user processor and the non-secure user processor. An HMI (308) comprised of trusted hardware for user input and output is time-multiplex-shared among the secure user processor (302), the non-secure user processor (304), and the cryptographic engine (306) in a secure fashion.

21 Claims, 5 Drawing Sheets

COMPUTER ARCHITECTURE FOR A HANDHELD ELECTRONIC DEVICE WITH A SHARED HUMAN-MACHINE INTERFACE

BACKGROUND OF THE INVENTION

1. Statement of the Technical Field

The inventive arrangements relate to personal electronic devices, and more particularly to personal digital assistant devices for storing, processing and communicating classified as well as unclassified data.

2. Description of the Related Art

Mobile computers, which are sometimes called personal digital assistants or PDAs, have the ability to store, process and communicate data. PDAs generally fall into one of several categories which can include handheld PCs, palm size PCs, smart phones, and handheld instruments. PDAs typically include some kind of microprocessor with a commercially available operating system such as Linux, Palm OS, or Windows CE (Pocket PC). Many PDAs also have built in LCD displays, touch sensitive screens, and keypads for the human/machine interface. Some PDAs also include wireless networking capabilities. For example, many such devices can communicate with other devices using well known wireless networking standards such as the IEEE 802.11 family of standards. The foregoing capabilities make these compact devices highly useful for a various business and personal applications.

Currently, there exist a wide variety of PDA devices with conventional operating systems and architectures. These commercially available PDAs with commercial-off-the-shelf (COTS) operating systems and COTS application programs generally satisfy the processing and communications requirements of most users. For example, they include applications for word processing, data storage, spreadsheets, email, internet browsing, time management, contact management, network communications, and voice communications. These applications generally function quite well and have interfaces that are familiar to many users. The familiarity of these applications to users, and the relatively low cost of COTS software are considered advantageous for a variety of reasons.

Some commercially available PDA devices and/or software applications incorporate various security measures in an effort to protect data which is stored, processed or communicated using the device. For example, encryption technology and password protection features are known in the art. Still, this level of security can be inadequate for managing information that is of a Confidential, Secret, or Top Secret nature, particularly when such information relates to matters of national security. For example, COTS operating systems and applications may not be sufficiently trustworthy for handling this type of information. Such programs can be susceptible to being compromised by various means including hacker attacks, viruses, worms, Trojan horses, and a wide variety of other means that are known to those skilled in the art.

Finally, notwithstanding the security limitations of COTS operating systems and applications, the basic architecture and interface systems of many commercial PDA devices may leave these devices vulnerable to intrusion. For example, COTS devices do not employ trusted microprocessors, do not employ physical separation of classified and unclassified data processing, nor do they employ physical tamper detection and subsequent memory zeroization. They may also lack the capability of wireless communications for classified data. Consequently, transport, processing or communication of classified data using a commercial PDA is not generally permitted.

In order to address some of the foregoing problems, personal electronic devices have been developed that are specifically designed to allow for transport of classified data, for example encryption keys. However, these devices are not generally designed to accommodate data processing or wireless communications of classified information. Secure PDA devices are also known in the art. These devices utilize a trusted operating system, trusted microprocessors, and a trusted human/machine interface. However, they generally do not include wireless communications capabilities.

Trusted operating systems, trusted applications, trusted microprocessors, and trusted human/machine interfaces are generally designed to more rigorously address the problem of computer security. For example, trusted operating systems undergo evaluation of their overall design, verification of the integrity and reliability of their source code, and systematic, independent penetration evaluation. In contrast, non-trusted operating systems are generally not designed to an equally high level with regard to security precautions.

SUMMARY OF THE INVENTION

The invention concerns a mobile PDA computer system. The mobile PDA computer system consists of a non-secure user processor, a secure user processor, and a cryptographic engine. The non-secure processor is comprised of non-trusted COTS microprocessor hardware (HW), a non-trusted COTS operating system, and non-trusted COTS application software. The secure processor is comprised of trusted microprocessor HW, a trusted operating system and trusted application software. The cryptographic engine is comprised of trusted hardware and trusted software. In addition to providing encryption and decryption services, the cryptographic engine provides a first data communication link that communicates data between the secure processor and the cryptographic engine and a second data communication link that communicates data between the non-secure processor and the cryptographic engine. In this way, the cryptographic engine forms a bridge between the secure processing side of the PDA and the non-secure processing side of the PDA.

The mobile PDA computer system includes a shared human/machine interface. The shared human/machine interface can include at least one input device to allow a user to input control commands and input data, and at least one output device to allow the mobile PDA computer system to inform a user. The shared human/machine interface can be configured for bi-directional communication of information between each of the secure user processor, the non-secure user processor, and the cryptographic engine. According to one embodiment, the shared human/machine interface can provide the foregoing bi-directional communication of information with the secure user processor, the non-secure user processor, and the cryptographic engine on a time multiplexed basis.

According to one aspect of the invention, the non-secure processor can have a wired communication transceiver and/or a wireless communications transceiver. These communication transceivers can be used to communicate unclassified data and voice transmissions. In addition these transceivers can be used to communicate encrypted classified data. The secure processor can communicate encrypted classified data files from the secure processor's file system to the non-secure processor. The encrypted files can then be communicated using the wired or wireless transceiver circuitry associated with the non-secure processor. Similarly, classified real time voice communications originating on the secure processing side of the device can be encrypted and communicated to the non-secure processor. The non-secure processor can utilize the wired or wireless transceiver to communicate such encrypted voice information.

The mobile PDA computer system can also include an audio jack for communicating audio information to and from a user. According to an embodiment of the invention, access to the audio jack can be shared between the secure user processor and the non-secure user processor. For example, access to the audio jack can be shared on a time multiplexed basis between the secure user processor and the non-secure user processor.

The invention can also include non-secure audio interface associated with the non-secure user processor for communicating audio information to and from the audio jack. The non-secure audio interface can be responsive to an interlock control signal. The interlock control signal can disable the non-secure audio interface when a secure audio interface associated with the secure user processor is communicating audio information to and from the audio jack.

The invention also includes a method for managing classified and unclassified data on a mobile PDA computer system. The method includes processing classified data exclusively using a secure user processor. The secure user processor includes a trusted microprocessor and a trusted operating system executing on the trusted microprocessor. The method also includes processing unclassified data exclusively using a non-secure user processor. The non-secure user process includes a non-trusted microprocessor and a non-trusted operating system executing on the non-trusted microprocessor. Encrypted and decrypted classified data is communicated between the secure user processor and the cryptographic engine using a first data communication link. Data from the secure processor and the cryptographic engine is communicated to the non-secure processor exclusively in an encrypted form using a second data communication link between the cryptographic engine and the non-secure processor. Further, the method includes communicating data between a user and each of the secure user processor, the non-secure user processor, and the cryptographic engine using a shared human/machine interface.

According to another aspect of the invention, a wireless communications transceiver can be used for communicating wireless unclassified data from the non-secure user processor. The method can further include communicating encrypted classified data provided from the secure user processor using the wireless communications transceiver. According to one aspect of the invention, the wireless communications transceiver can be selected from the group consisting of a wireless LAN transceiver and a cellular telephone transceiver.

DETAILED DESCRIPTION OF THE PREFERRED EMBODIMENTS

Figure 1:
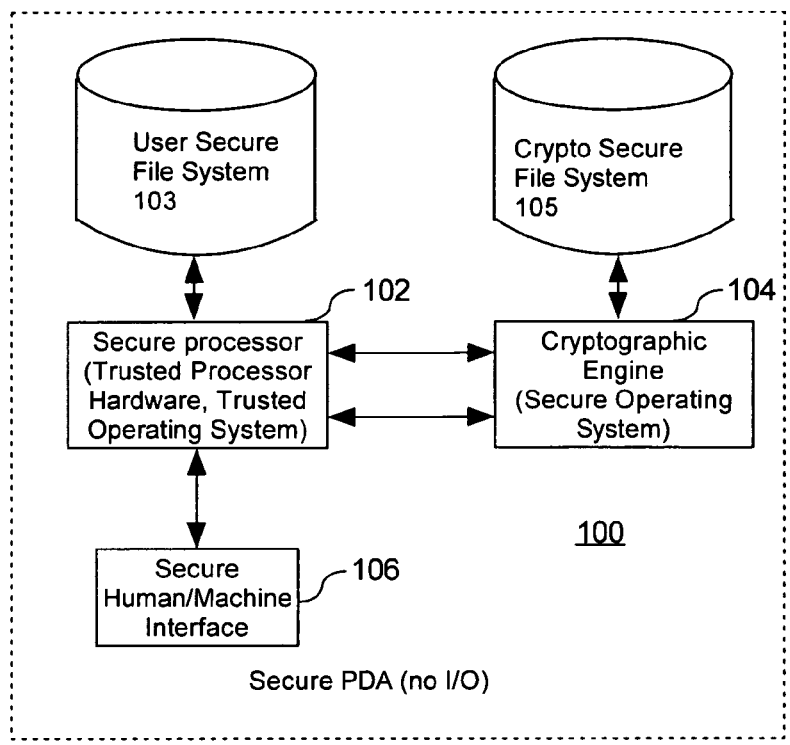
FIG. 1 is block diagram that is useful for understanding an architecture of a secure PDA

The invention concerns a computer architecture for a mobile PDA computer system. FIG. 1 shows a simplified block diagram of a secure PDA of the prior art that includes trusted hardware and trusted software (operating system and application software). As used herein, the term "trusted" is used with reference to computer hardware, operating systems, and/or software applications that have been designed to ensure secure storage, processing and communication of data. Trusted hardware and trusted software can be combined to provide secure data processing. Trusted hardware and software are generally designed and tested to ensure the integrity and reliability of their source code, and their resistance to penetration. In contrast, non-trusted hardware and non-trusted software are generally not designed to an equally high level with regard to security precautions. Accordingly, when integrated into a computer system, those systems are often referred to as non-secure.

Secure PDA 100 utilizes secure user processor 102 comprised of trusted hardware (HW) and trusted software (SW) for securing data that is stored on the device. A user secure file system 103 is provided for storing classified data. A cryptographic engine 104 is provided with trusted hardware and trusted software for providing encryption and decryption services. A crypto secure file system 105 is used to store classified data and files used by the cryptographic engine 104. A secure human/machine interface (HMI) 106 is also provided. However, for security reasons, PDA devices of this type generally do not include machine input/output (I/O) facilities. Thus PDA 100 does not have a USB port, wireless networking, or cellular telephone communications capabilities. PDA 100 can generally satisfy the requirements for accessing secure file systems. However, the operating system and applications can be expensive and unfamiliar to many users who more often utilize commercial-off-the-shelf (COTS) systems.

Figure 2:
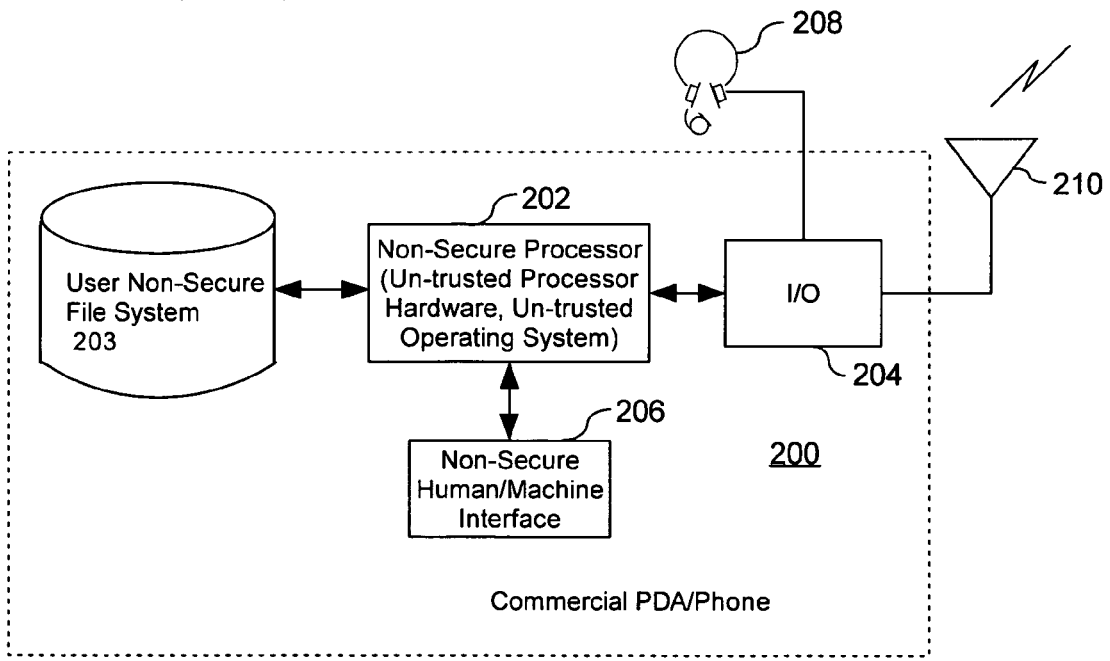
FIG. 2 is a block diagram that is useful for understanding an architecture of a non-secure commercial PDA/Phone.

In contrast to the secure PDA in FIG. 1, a commercial PDA/phone architecture is shown in FIG. 2. The commercial PDA/phone 200 can include a non-secure processor 202 comprised of non-trusted COTS microprocessor hardware and non-trusted COTS software. A user non-secure file system 203 can be used for storing unclassified user files and data. The commercial PDA/phone will make use of COTS hardware and software to satisfy the processing and communications requirements of users. The commercial PDA/phone will make use of a conventional non-secure HMI 206, and can include non-secure I/O circuitry 204. The I/O circuitry 204 can include wired and/or wireless LAN transceivers, and cellular telephone transceiver circuitry. A suitable antenna or antennas 210 can be provided for any wireless applications. Audio interface circuitry can also be provided for headset 208. Significantly, PDA 200 will not generally satisfy the requirements for accessing secure file systems. However, commercial PDA 200 benefits from the economy associated with use of COTS applications and a COTS operating system. Another advantage is that users tend to be well familiar with such operating systems and applications.

Figure 3:
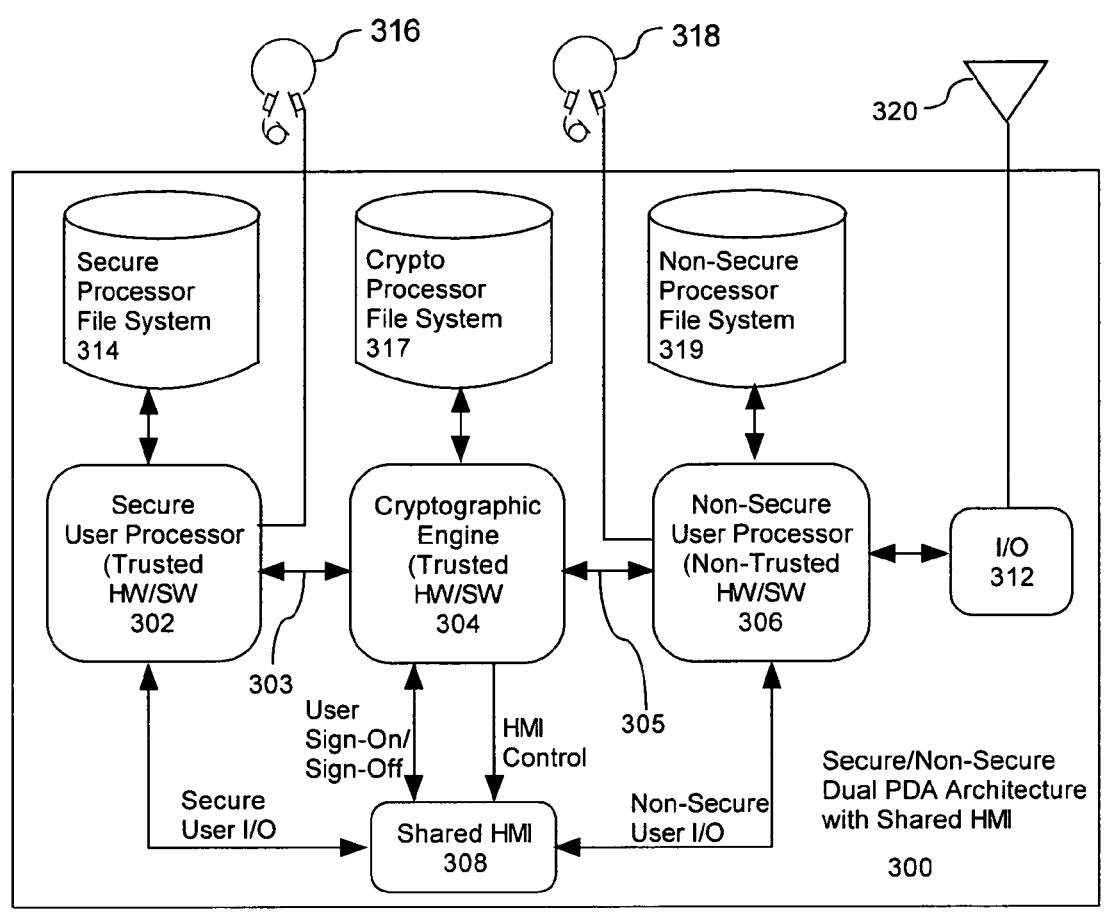
FIG. 3 is a block diagram that is useful for understanding an architecture of a PDA that can be used for classified and unclassified data processing.

Turning now to FIG. 3, there is shown an architecture for a mobile PDA computer system 300 that offers the combined advantages of secure PDA 100 and commercial PDA 200. The architecture in FIG. 3 can include a secure user processor 302 composed of trusted microprocessor hardware executing trusted operating system software and trusted application software. Secure user processor 302 can have access to a secure file system 314. Secure user processor 302 receives user inputs and provides information to users through a shared HMI 308.

Non-secure user processor 306 is also provided as part of PDA 300. Non-secure user processor 306 is composed of non-trusted microprocessor hardware executing a non-trusted operating system and non-trusted application software. Non-secure user processor 306 can store unclassified user files and data in a user non-secure file system 319. Non-secure user processor 306 is capable of receiving and transmitting data through I/O interface 312, which can include wired and/or wireless LAN transceivers, cellular telephone transceiver circuitry and any other conventional data communication service. A suitable antenna or antennas 320 can be provided for any wireless applications. Non-secure user processor 306 receives user inputs and provides information to users through a shared HMI 308.

PDA 300 also includes a cryptographic engine 304. The cryptographic engine is implemented with trusted software (operating system and application software) and trusted microprocessor hardware. The cryptographic engine is provided for encrypting and decrypting classified data. A crypto secure file system 317 is provided for storing classified data and files used by cryptographic engine 304. A first data communication link 303 is provided for communicating classified data between the secure user processor 302 and the cryptographic engine 304. A second data communication link 305 is provided for communicating encrypted classified data between the non-secure user processor 306 and the cryptographic engine. Data communicated between secure user processor 302 and cryptographic engine 304 will be encrypted before being passed to the non-secure user processor 306. In contrast, data communicated between non-secure user processor 306 and cryptographic engine 304 can be unencrypted unclassified data in some instances and encrypted classified data in other instances. Still, the invention is not limited with regard to the specific type of data that is communicated on the first and second data links.

The first and second data communication links 303, 305 can be any suitable type serial or parallel type data channels. For example, if the communication link is a parallel type data link then it can conform to any of a number of well known bus standards, including without limitation ISA, EISA, VESA, PCI, EMIF and so on. Alternatively, if a serial data channel is used, then it can be an I2C, SPI, Microwire, Maxim or other type serial data bus.

As shown in FIG. 3, secure user processor 302 and non-secure user processor 306 can also share a human/machine interface (HMI). For example, secure user processor 302 and non-secure user processor 306 can each receive user inputs and provide information to users through a shared HMI 308. Further, the cryptographic engine 304 can also receive user inputs and provide information to users through the shared HMI 308.

Selection of the secure user processor 302, cryptographic engine 304, or non-secure user processor 306 that is connected to the shared HMI 308 can be performed by a digital multiplexer internal to shared HMI 308. The shared HMI 308 can be configured for bi-directional communication of information between the user and one of the foregoing components at a time. In order to provide secure access to secure processor 302 and cryptographic engine 304, shared HMI 308 can include one or more security features. The shared HMI 308 can also be designed to prevent a user from being misled about which application is actually in use. For example, this can be accomplished by means of highly distinctive and easily recognized visual display indications that cannot be obstructed. Such indicators can assure the user regarding the identity of the application with which the user is working. Secure HMI features of this type are implemented in a variety of ways that are known to those skilled in the art.

According to one aspect of the invention, the shared HMI 308 can provide bi-directional communication of information with the secure user processor 302, the non-secure user processor 306, and the cryptographic engine 304, on a time multiplexed basis. The HMI-resident multiplexer can alternately provide the secure user processor 302, non-secure user processor 306, and the cryptographic engine 304 with access to the shared HMI keypad and display.

A PDA computer architecture as show in FIG. 3 can offer several important advantages. One basic advantage of the foregoing arrangement is that it overcomes some limitations of conventional secure and non-secure PDAs. For example, the system can still offer all of the benefits of conventional commercial PDA devices. Such features can include familiar and inexpensive COTS operating systems and applications. Such COTS operating systems and applications can be used with the non-secure user processor 306. The PDA 300 also offers the benefit of wired and wireless LAN communication services, cellular telephone services and so on. In addition to these features, the PDA architecture shown in FIG. 3 can permit users to access a secure file system 314. The secure file system 314 can be maintained by secure processor 302 in a data store.

Another important advantage of the PDA architecture in FIG. 3 is that the shared human machine interface lowers the size, weight and power requirements of the secure/non-secure dual PDA architecture. As will hereinafter be described in more detail, the foregoing arrangement also ensures that classified information contained on the secure processing side of the architecture is not passed to the unclassified processing hardware when the HMI is time multiplexed for use between the secure user processor and the non-secure user processor.

Figure 4:
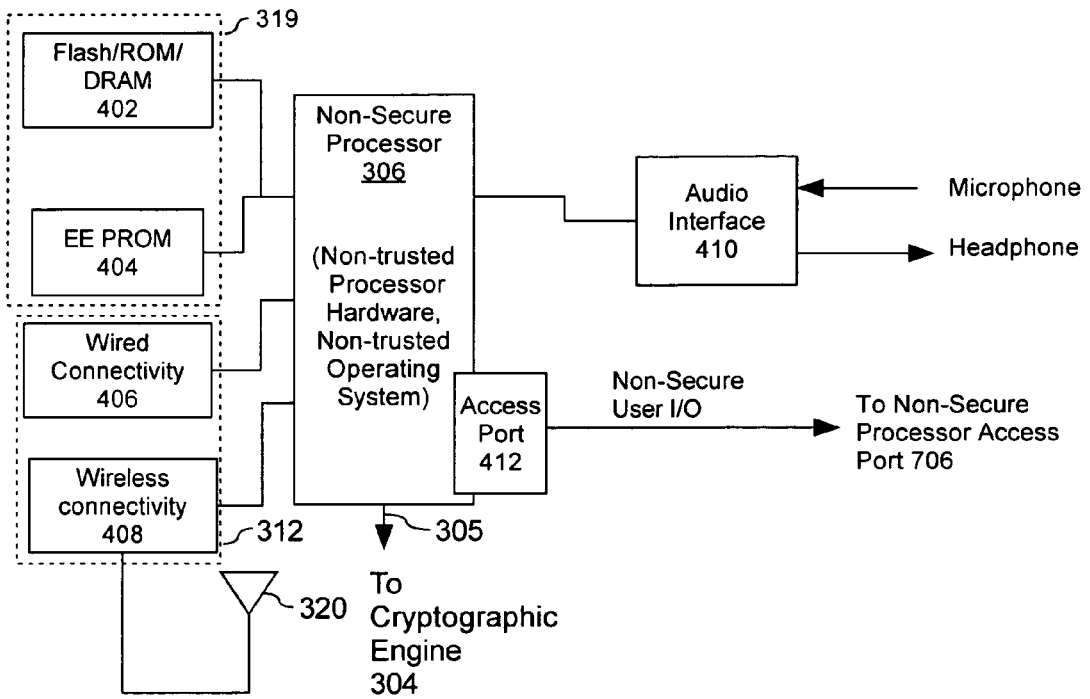
FIG. 4 is a more detailed block diagram showing the non-secure user processor portion of the PDA architecture in FIG. 3.

Referring now to FIG. 4, there is shown a more detailed block diagram of a portion of the PDA 300 that includes non-secure user processor 306. As noted above, non-secure user processor 306 can be comprised of non-trusted processor hardware. For example, the non-trusted processor hardware can be any one of a variety of well known COTS processors that are widely available. For example, the non-trusted processor hardware can be selected from the StrongARM or XScale processors (e.g., SA-110 or PXA270) available from Intel Corp. of Santa Clara, Calif., the i.MX or Dragonball family of processors available from Freescale Semiconductor, Inc. of Austin, Tex., or the OMAP family of processors offered for sale by Texas Instruments of Dallas, Tex.

According to one embodiment, non-secure user processor 306 can also be comprised of a non-trusted COTS operating system. For example any of a variety of well known COTS operating systems suitable for use in a PDA can be used for this purpose. According to one embodiment, the non-secure processor 306 can utilize the Windows CE operating system that is made available by Microsoft Corporation of Redmond, Wash. However, the invention is not limited in this regard and other types of non-trusted operating systems can also be used.

Non-secure user processor 306 communicates with non-secure processor file system 319. As shown in FIG. 4, the non-secure processor file system 319 can include one or more subsystem components including data store 402 and EE PROM 404. Data store 402 can include flash memory, read-only memory (ROM), and/or dynamic random access memory (DRAM). The non-trusted operating system for the non-secure processor can be stored in non-volatile memory in data store 402 or flash EE PROM 404. Application software can be loaded in flash memory or DRAM as needed.

As shown in FIG. 4, I/O interface 312 can include wired connectivity block 406 for USB or other wired connectivity services. Wireless connectivity block 408 can include any wireless transceiver system now known or known in the future for communicating voice and/or data. For example, the wireless connectivity block 408 can be any suitable wireless LAN transceiver system. According to one embodiment of the invention, wireless connectivity block 408 can be configured for operation in accordance with any one of the 802.11 family of wireless network standards. However the invention is not limited in this regard. Instead, any other wireless networking standard can also be implemented in accordance with the inventive arrangements. Further, wireless connectivity block 408 can also comprise cellular telephone transceiver circuitry. For example, the cellular telephone transceiver circuitry can be designed to operate using any one of a variety of well known cellular telephone transmission protocols such as TDM, GSM, or CDMA.

Additional sub-systems connected to non-secure user processor 306 can include audio interface 410. Audio interface 410 can include at least one suitable audio codec, analog to digital and digital to analog conversion circuitry, as well as any necessary audio amplifier circuitry (not shown). Audio interface 410 can also include any other circuitry necessary to allow PDA 300 to output audio data associated with the non-secure user processor 306. For example, such audio data can be in a digital format such as MP3. Alternatively, any other suitable audio data format can be used.

In the event that wireless input/output subsystem 312 includes cellular telephone transceiver circuitry, then the audio interface 410 can include a voice codec that can provide the user audio interface for that application. In particular, the voice codec can code voice signals received from a microphone associated with headset 318. Similarly, the voice codec can decode voice signals received via wireless connectivity block 408 and output such decoded audio to an earphone associated with headset 318. Still, it should be understood that the invention is not limited to any particular arrangement with regard to audio interface 410. Audio interfaces for cellular telephones and MP3 audio playback are well known in the art and all such arrangements are contemplated for audio interface 410 within the scope of the present invention.

Non-secure user processor 306 can interface with a user through shared HMI 308. In this regard, the non-secure user processor 306 can communicate with shared HMI 308 through non-secure processor access port 412. Shared HMI 308, to be detailed later, can include a color display, a touch screen, and a keypad/pointing device.

Figure 5:
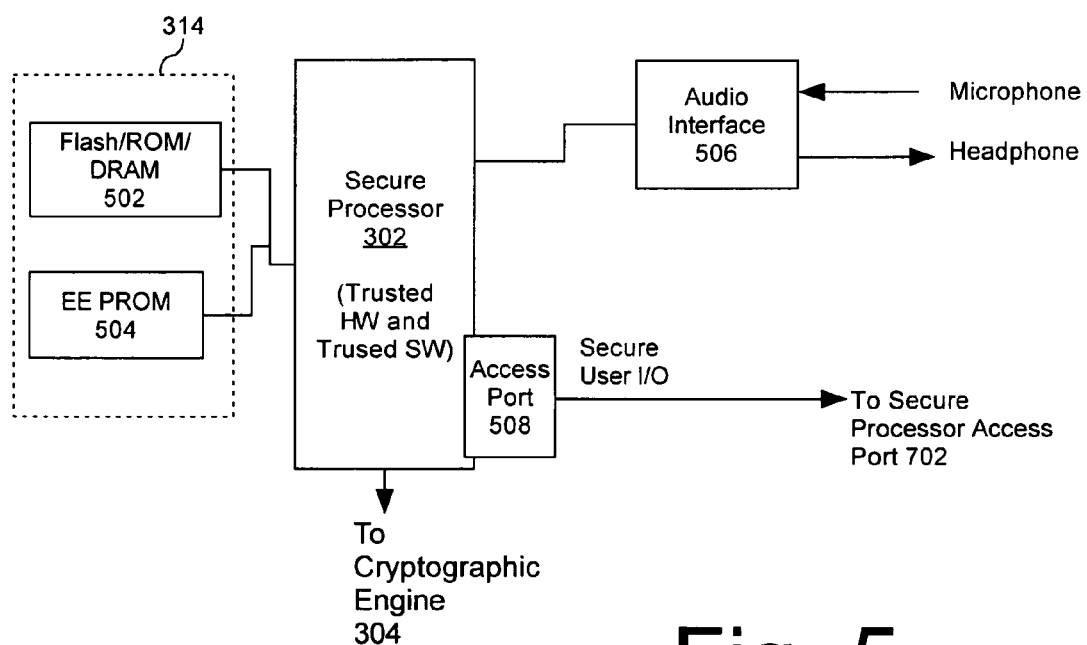
FIG. 5 is a more detailed block diagram showing the secure user processor portion of the PDA architecture in FIG. 3.

Referring now to FIG. 5, there is shown a more detailed block diagram of the portion of PDA 300 including secure user processor 302. Secure user processor 302 can be custom-designed processor or can also be one of a variety of well known COTS processors that are widely available. Regardless of whether the secure user processor 302 is comprised of custom components, COTS components, or a mixture of custom and COTS components, the secure user processor must be designed and developed utilizing trusted methods and techniques to ensure the integrity and reliability of the device, and its resistance to penetration. For example, the secure user processor 302 can be housed inside a physical barrier that will detect any attempt to open the enclosure and automatically zeroize any stored sensitive/classified information contained within. The secure user processor 302 can also be housed inside an enclosure that provides radio frequency (RF) shielding to guard against radiating sensitive/classified information.

Secure user processor 302 will also have trusted operating system software and trusted application software. Trusted software is designed and tested to ensure the integrity and reliability of the code and its resistance to penetration. For example, trusted software must be developed utilizing trusted techniques, which may include peer reviews, testing of all paths through the control logic, and in some cases, a mathematical proof of correctness.

Secure user processor 302 can communicate with secure processor file system 314. Secure processor file system 314 can include one or more subsystem components including data store 502 and EE PROM 504. Data store 502 can include flash memory, read-only memory (ROM), dynamic random access memory (DRAM). The trusted operating system used in secure user processor 302 can be stored in non-volatile memory in data store 502 or flash EE PROM 504. Application software can be loaded in flash memory or DRAM as needed. Additional sub-systems connected to secure user processor 302 can include audio interface 506.

Audio interface 506 can include at least one suitable audio codec, analog to digital and digital to analog conversion circuitry, as well as any necessary audio amplifier circuitry (not shown). Audio interface 506 can also include any other circuitry necessary to allow PDA 300 to output audio data associated with the secure user processor 302. For example, MP3 audio can be used for this purpose. In the event that wireless input/output subsystem 312 includes cellular telephone transceiver circuitry, then the audio interface 506 can include a voice codec that can provide the user audio interface for that application. In particular, the voice codec can code voice signals received from a microphone associated with headset 316. Similarly, the voice codec can decode voice signals received via wireless connectivity block 408 and output such decoded audio to an earphone associated with headset 316. Still, it should be understood that the invention is not limited to any particular arrangement with regard to audio interface 506. Audio interfaces for cellular telephones and MP3 audio playback are well known in the art and all such arrangements are contemplated for audio interface 506 within the scope of the present invention.

Secure user processor 302 can interface with a user shared HMI 308. In this regard, secure user processor 302 can communicate with shared HMI 308 through secure processor access port 508. Shared HMI 308, to be detailed later, can include a color display, a touch screen, and a keypad/pointing device.

Figure 6:
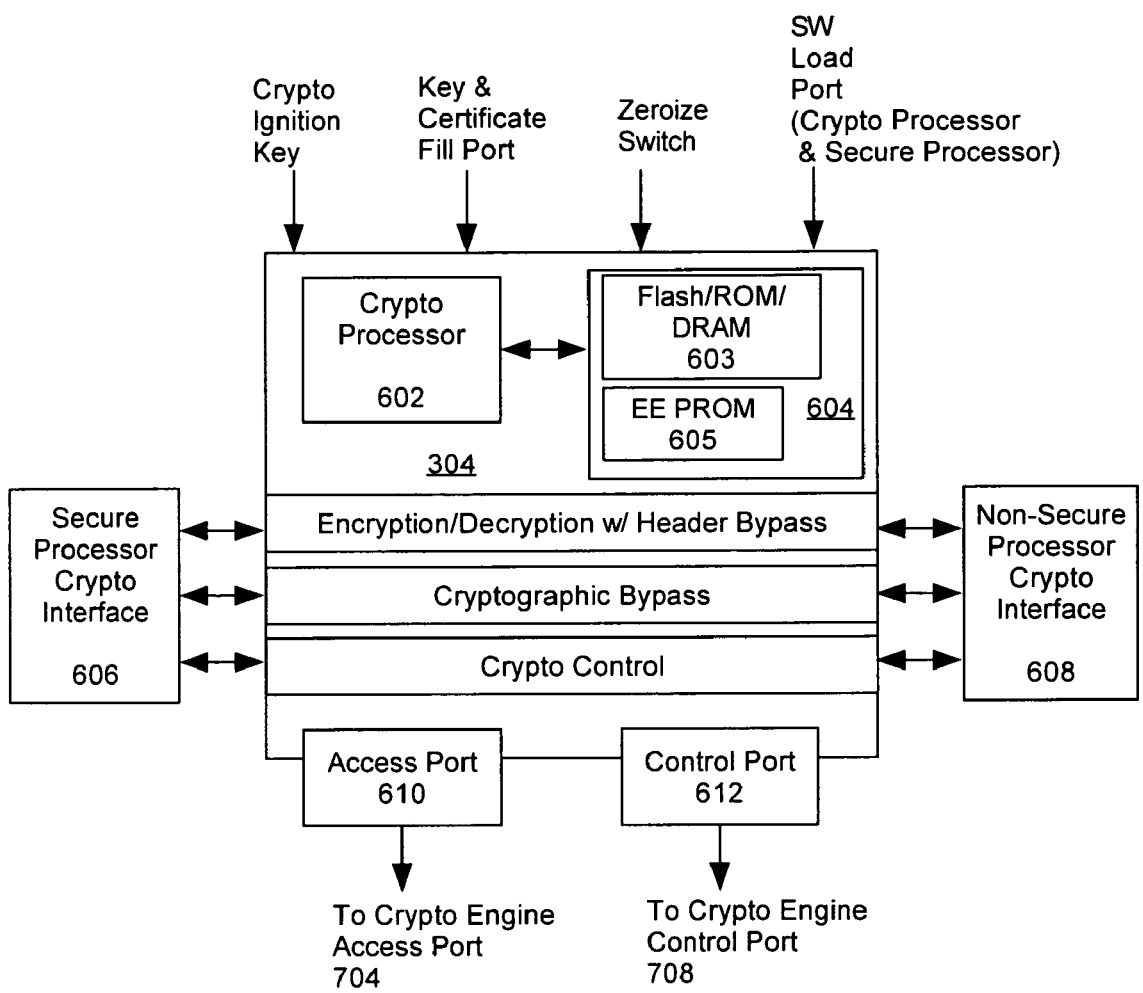
FIG. 6 is a more detailed block diagram showing the cryptographic engine portion of the PDA architecture in FIG. 3.

Referring now to FIG. 6, there is shown a more detailed block diagram of cryptographic engine 304. Cryptographic engine 304 can include a cryptographic processor 602 and a cryptographic file system 604 maintained in a data store. Cryptographic engine 304 can be one of several available cryptographic engines. According to one embodiment, the cryptographic engine can be a Sierra II Crypto processor which is available from Harris Corporation of Melbourne, Fla. The cryptographic engine can include configurable key lengths and can be programmed with one or more encryption algorithms. As illustrated in FIG. 6, cryptographic engine 304 can include several control and data ports including a crypto ignition key port, a key and certificate fill port, a zeroize switch, and a software load port. The software load port can be used for loading software for executing on the cryptographic engine 304 and for loading software used by secure processor 302.

The cryptographic file system 604 can be used to store cryptographic algorithms, crypto keys and certificates, audit data, policy profile, and any other information necessary for the operation of the cryptographic engine. The cryptographic engine 304 can also include one or more security features. For example, the cryptographic engine 304 can include a secure certified operating environment, security auditing, security policy enforcement, file integrity checking and/or trusted boot logic. Cryptographic file system 604 can be implemented in flash/ROM/DRAM 603 and/or EE PROM 605.

As shown in FIG. 6, the cryptographic engine 304 can be responsive to one or more control signals from secure user processor 302 and non-secure user processor 306 via the crypto interfaces 606, 608 to provide various encryption functions. For example, according to one aspect of the invention, the cryptographic engine can provide an encryption/decryption function for data communicated between the secure and non-secure processors. Any data of a sensitive nature that is transferred from the secure user processor to the cryptographic engine 304 is encrypted before being transferred to the non-secure user processor. The encryption function can be implemented with or without packet header bypass.

Cryptographic engine 304 can interface with a user through HMI Access Port 610 to Shared HMI 308. Shared HMI 308, to be detailed later, can include a color display, a touch screen, and a keypad/pointing device. The cryptographic engine 304 obtains user sign-on/off and/or security credentials via the HMI Access Port 610 to authenticate the user prior to providing access to the user processors. The cryptographic engine 304 is responsible for commanding zeroization of the Shared HMI 308 via HMI Control Port 612. Following zeroization, the cryptographic engine 304 is then responsible for commanding the Shared HMI 308 via HMI Control Port 612 to connect to either the secure user processor 302 or the non-secure user processor 306.

Figure 7:
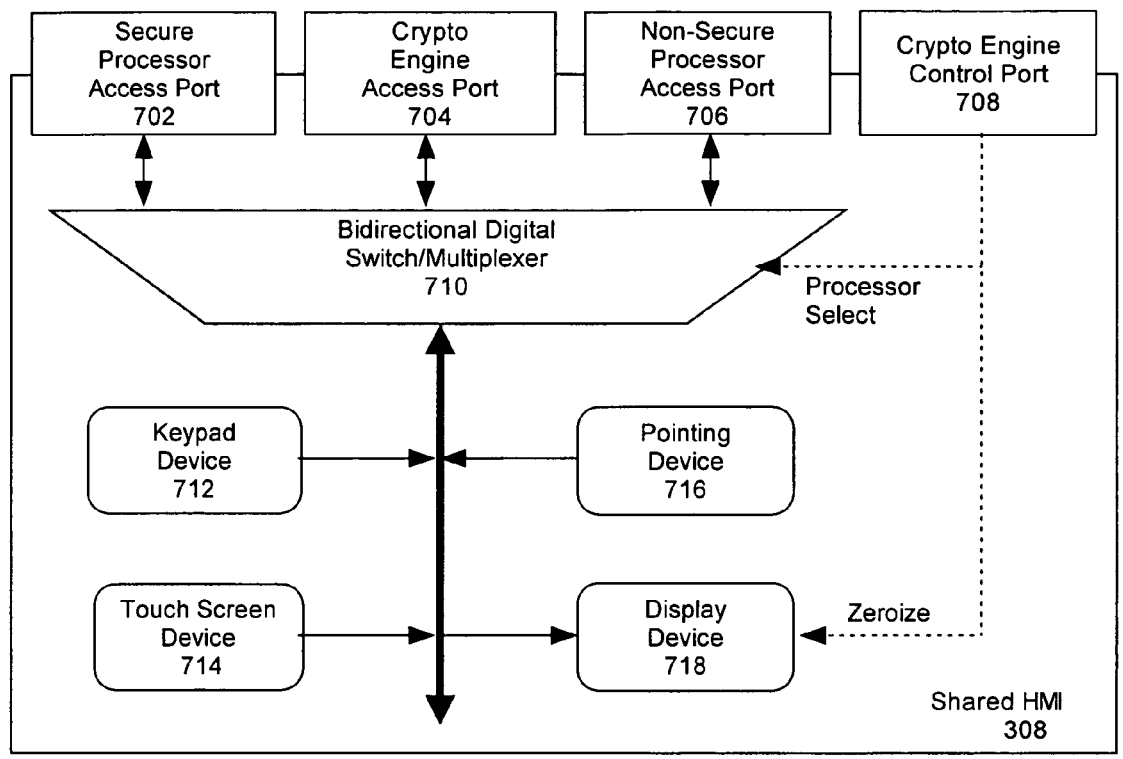
FIG. 7 is a more detailed block diagram showing the shared human/machine interface portion of the PDA architecture in FIG. 3.

Referring now to FIG. 7, there is shown a more detailed block diagram of Shared HMI 308. The shared HMI 308 can include one or more input devices which allow a user to input control commands and input data. According to one embodiment, these input devices can include a pointing device 716, a keypad device 712, and a touch screen device 714. However, the invention is not limited in this regard. The shared HMI 308 can also include a display device 718, which can present alphanumeric and graphical data. The display 718 can be a color or monochrome type display.

Non-secure user processor 306, secure user processor 302, and cryptographic engine 304 can connect to HMI access ports 706, 702, and 704 respectively for communicating information to and from Shared HMI 308. The HMI access ports 706, 702, and 704 can be any suitable circuitry for communicating information, such as data and graphics, between the shared HMI Interface 308 and any of non-secure user processor 306, secure user processor 302, and cryptographic engine 304. HMI digital switch/multiplexer 710 can be comprised of hardware or software controlled digital transfer selector switch. The switch 710 can be controlled by crypto engine control port 708, which is connected to the cryptographic engine 304.

According to one embodiment of the invention, the shared HMI 308 can also be an information secure device. For example, the shared HMI 308 can be contained within a RFI shielded enclosure. Moreover, the power supply lines for the HMI 308 can be filtered to ensure that signals associated with secure user processor 302 are not communicated along the power supply lines back to the non-secure user processor 306. The shared HMI 308 can also be designed to prevent a user from being misled about which application and security level is actually in use. For example, this can be accomplished by means of highly distinctive and easily recognized visual display indications that cannot be obstructed. Such indicators can assure the user regarding the identity of the application with which the user is working. HMI features of this type are implemented in a variety of ways that are known to those skilled in the art.

The shared HMI 308 can also be responsive to command and control circuitry contained in the cryptographic processor 304 for deleting sensitive information from the HMI. This process is sometime referred to as zeroizing. Suitable circuitry, software, firmware or a combination of these can be provided in the shared HMI 308 for this purpose. In general, the sensitive information contained in HMI 308 can be deleted after the HMI 308 has been used for the bi-directional communication of information with the secure user processor 302 or cryptographic processor 304 and before being used for the bi-directional communication of information with the non-secure user processor.

With the PDA architecture as described herein in relation to FIG. 3-7, the user is capable of storing, processing, and communicating classified as well as unclassified data. Unclassified data storage and user processing of unclassified data can be performed by non-secure user processor 306. The architecture provides for the use of non-trusted COTS operating systems and COTS applications for the non-secure user. The use of COTS hardware and software for the non-secure user processor provides the users with familiar user interfaces expected by the user community. In contrast, classified data storage and user processing of classified data can be provided using the secure user processor 302 and a secure file system 314 accessed by secure processor 302. Any data of a sensitive nature transferred from the secure user processor to the non-secure user processor can be encrypted by the cryptographic engine 304. An advantage of the foregoing architecture is that it (1) provides for physical separation of classified data from data which is unclassified or encrypted/classified data, and (2) provides secure access to sensitive files.

The foregoing arrangement also facilitates a secure/non-secure PDA architecture that provides for wired and wireless communications capabilities. Unclassified data can be transmitted using conventional wired connectivity 406 or wireless connectivity 408. Significantly, however, data that is of a sensitive nature can also be transmitted. For example, encrypted data stored in a secure file system associated with secure user processor 302 can be communicated from secure user processor 302 to non-secure user processor 306, without being unencrypted. Unencrypted data can be encrypted by cryptographic engine 304 before being communicated from the secure user processor 302 to the non-secure user processor 306. Thereafter, the encrypted data can be communicated over-the-air by means of non-secure user processor 306 and wired connectivity 408 using COTS software applications. Likewise, text messages and other communications originating from the shared HMI 308 can be encrypted when passed from secure user processor 302 to non-secure user processor 306. Consequently, any of the wired connectivity 406 or wireless connectivity services 406 can be used to communicate the data to third parties.

Another advantage of the foregoing arrangement is that it allows a user with classified and unclassified voice communications to take advantage of the wireless connectivity 408 for telecommunications services. For example, if the PDA 300 is equipped with a cellular telephone transceiver or other wireless transceiver that can be used for voice communications, then a user can plug in a headset 316 to provide encrypted communications with third parties. Audio data communicated to secure processor 302 by headset 316 can be encrypted by cryptographic engine 304 before ever passing to the non-secure side of the architecture of PDA 300. Likewise, classified audio communications can be received in an encrypted state and can remain encrypted until passing to the secure processor side of the PDA 300. Unclassified voice communications can be conducted using headset 318 and non-secure user processor 306 in the conventional manner. However, under no circumstances will classified audio information be communicated to the non-secure audio processing hardware so it cannot be inadvertently transmitted in an unencrypted state.

We claim:

1. A mobile PDA computer system, comprising:
 a secure user processor, comprising:
  a trusted microprocessor;
  a trusted operating system executing on said trusted microprocessor;
  a trusted application software executing on said trusted microprocessor;
 a non-secure user processor, comprising:
  a non-trusted microprocessor;
  a non-trusted operating system executing on said non-trusted microprocessor;
  a non-trusted application software executing on said non-trusted microprocessor;
 a cryptographic engine configured for encrypting and decrypting data comprising:
  a trusted cryptographic processor;
  a trusted operating system executing on said trusted cryptographic processor;
 a first data communication link for communicating data between said secure user processor and said cryptographic engine;
 a second data communication link for communicating data between said non-secure user processor and said cryptographic engine; and
 a shared human/machine interface comprising a digital multiplexer that is exclusively responsive to said cryptographic engine for selectively enabling exclusive bi-directional communication of information between a user and one of said secure user processor, said non-secure user processor and said cryptographic engine; and
 a third data communication link for communicating control information between said cryptographic engine to said shared human/machine interface;
 wherein said non-secure user processor is operatively connected to a communications transceiver, said secure processor is configured to utilize said non-secure processor to exchange information with said communications transceiver, and said cryptographic engine is further configured to command said shared human/machine interface to delete sensitive information contained therein and to command said digital multiplexer to connect to said non-secure user processor only after said sensitive information has been deleted from said shared human/machine interface.

2. The mobile PDA computer system according to claim 1, wherein said shared human/machine interface provides said bi-directional communication of information with said secure user processor, said non-secure user processor, and said cryptographic engine on a time multiplexed basis.

3. The mobile PDA computer system according to claim 2, wherein said sensitive information is deleted from said human/machine interface after it has been used for said bi-directional communication of information with said secure user processor or said cryptographic engine.

4. The mobile PDA computer system according to claim 2, wherein said human/machine interface comprises at least one input device to allow a user to input control commands and input data, and at least one output device to allow the mobile PDA computer system to inform a user.

5. The mobile PDA computer system according to claim 1, wherein said communications transceiver comprises a wireless communications transceiver.

6. The mobile PDA computer system according to claim 5, wherein said wireless communications transceiver is selected from the group consisting of a wireless LAN transceiver and a cellular telephone transceiver.

7. The mobile PDA computer system according to claim 1, further comprising a secure file system, wherein said secure file system serves said secure data in decrypted form exclusively to said secure user processor.

8. The mobile PDA computer system according to claim 7, wherein said secure data in said secure file system is available to said non-secure user processor only in an encrypted format.

9. The mobile PDA computer system according to claim 8, wherein said secure data in said secure file system is available to said secure user processor in a decrypted form only after a user of said secure user processor has provided a user authentication.

10. The mobile PDA computer system according to claim 1, wherein two audio interfaces are provided, a first audio interface for communicating audio information to and from said secure user processor, and a second audio interface for communicating audio information to and from said non-secure user processor.

11. A method for managing classified and unclassified data on a mobile PDA computer system, comprising:
 processing classified data exclusively using a secure user processor, comprising a trusted microprocessor and a trusted operating system executing on said trusted microprocessor;
 processing unclassified data exclusively using a non-secure user processor operatively connected to a communications transceiver, comprising a non-trusted microprocessor and a non- trusted operating system executing on said non-trusted microprocessor;
 communicating encrypted and decrypted classified data between said secure user processor and said cryptographic engine using a first data communication link;
 communicating data from said secure processor and said cryptographic engine to said non- secure processor exclusively in an encrypted form using a second data communication link between said cryptographic engine and said non-secure processor;
 communicating data between a user and each of said secure user processor, said non-secure user processor, and said cryptographic engine using a shared human/machine interface; and
 communicating encrypted classified data between said secure processor and said communications transceiver using said non-secure processor;
 communicating a first command from said cryptographic engine to said shared human/machine interface for deleting sensitive information contained in said shared human/machine interface; and
 subsequent to said deletion of said sensitive information, communicating a second command from said cryptographic engine to a digital multiplexer for connecting said shared human/machine interface to said non-secure user processor.

12. The method according to claim 11, further comprising performing wireless data communication of unclassified data from said non-secure processor using said communications transceiver.

13. The method according to claim 12, wherein said communicating of said encrypted classified data further comprises performing a wireless data communication from said secure processor using said communications transceiver.

14. The method according to claim 12, further comprising selecting said communications transceiver for performing said wireless data communication from the group consisting of a wireless LAN transceiver and a cellular telephone transceiver.

15. The method according to claim 11, further comprising communicating classified audio information to and from said secure user processor with a first audio interface, and communicating unclassified audio information to and from said non-secure user processor with a second audio interface distinct from said first audio interface.

16. The method according to claim 11, wherein said sensitive information is deleted from said shared human/machine interface after a first communication session between said shared human/machine interface and said secure user processor and before a second communication session between said shared human/machine interface and said non-secure user processor.

17. The method according to claim 11, further comprising zeroizing said shared human/machine interface after a first communication session between said shared human/machine interface and said non-secure user processor and before a second communication session between said shared human/machine interface and said secure user processor.

18. The method according to claim 17, further comprising controlling said zeroizing with said cryptographic engine.

19. A mobile PDA computer system, comprising:
a secure user processor, comprising:
   a trusted microprocessor;
   a trusted operating system executing on said trusted microprocessor;
   a trusted application software executing on said trusted microprocessor;
a non-secure user processor, comprising:
   a non-trusted microprocessor;
   a non-trusted operating system executing on said non-trusted microprocessor;
   a non-trusted application software executing on said non-trusted microprocessor;
a cryptographic engine configured for encrypting and decrypting data comprising:
   a trusted cryptographic processor;
   a trusted operating system executing on said trusted cryptographic processor;
a first data communication link for communicating data between said secure user processor and said cryptographic engine;
a second data communication link for communicating data between said non-secure user processor and said cryptographic engine;
a shared human/machine interface (HMI) comprising a digital multiplexer that is exclusively responsive to said cryptographic engine configured for selectively enabling an exclusive bi-directional communication of information between a user and only one of said secure user processor, said non-secure user processor and said cryptographic engine; and
a third data communication link for communicating control information between said cryptographic engine and said secure HMI;
wherein said cryptographic engine is further configured to command said shared HMI to delete sensitive information contained therein and to command said digital multiplexer to connect to said non-secure user processor only after said sensitive information has been deleted from said secure HMI.

20. The mobile PDA computer system according to claim 19, wherein said shared HMI is contained within a Radio Frequency Interference shielded enclosure.

21. The mobile PDA computer system according to claim 1, wherein the trusted cryptographic processor serves as the only communication link between the secure user processor and non-secure user processor.

* * * * *